United States Patent Office
3,555,099
Patented Jan. 12, 1971

3,555,099
PEROXYKETALS
Giuliano Ballini and Carlo Bujtar, Ferrara, Italy, assignors to Montecatini Edison S.p.A., Milan, Italy, a corporation of Italy
No Drawing. Continuation of application Ser. No. 505,760, Oct. 29, 1965. This application Mar. 6, 1969, Ser. No. 805,046
Claims priority, application Italy, Oct. 30, 1964, 23,318/64
Int. Cl. C07c 43/30
U.S. Cl. 260—610                                                2 Claims

ABSTRACT OF THE DISCLOSURE

New peroxyethers having the general formula

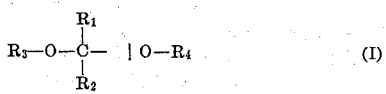

wherein both $R_1$ and $R_2$ are unhalogenated radicals other than hydrogen.

CROSS-REFERENCE TO RELATED APPLICATION

This application is a continuation of our copending application Ser. No. 505,760, filed Oct. 29, 1965, now abandoned.

The present invention relates to new peroxidic compounds of ethers. More particularly, this invention relates to peroxyketals having the general formula:

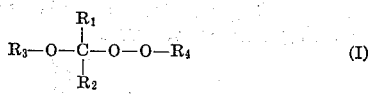

in which $R_1$ and $R_2$ are alkyl, cycloalkyl, aryl or alkylaryl radicals containing up to 10 carbon atoms, which radicals may be halogen-substituted, or wherein $R_1$ and $R_2$ may, taken together and in conjunction with the central carbon atom (C) form a cycloaliphatic ring, or $R_2$ may have the formula:

in which $R_5$ is an alkylene cycloalkylene, alkenylene, alkinylene or arylene radical containing up to 10 carbon atoms; $R_6$ is the same as $R_1$; $R_7$ is an alkyl, cycloalkyl, aryl or arylalkyl radical containing up to 10 carbon atoms, which radical may be alkyl-substituted and/or halogen-substituted; $R_8$ is an alkyl or tert.-arylalkyl radical containing up to 10 carbon atoms, which radical may be alkyl substituted and/or halogen-substituted, or $R_8$ may be a radical having the formula:

in which $R_7$ is as defined in Formula II and $R_9$ and $R_{10}$ are the same as $R_1$ and respectively $R_2$ that are defined in Formula I;
$R_3$ is an alkyl, cycloalkyl, aryl or arylalkyl radical containing up to 10 carbon atoms, which radical may be alkyl-substituted and/or halogen-substituted and is the same as $R_7$;
$R_4$ is the same as $R_8$ and is an alkyl or tert.-arylalkyl radical containing up to 10 carbon atoms, which radical may be alkyl-substituted and/or halogen-substituted, or $R_4$ may be a radical having the formula:

in which $R_7$ is as defined in Formula II and $R_9$ and $R_{10}$ are as defined in Formula III and, only when $R_2$ is not a radical defined by the Formula II, $R_4$ may be a radical having the formula:

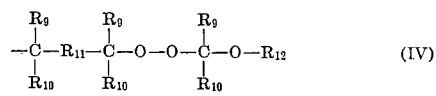

in which $R_9$ and $R_{10}$ are the same as $R_1$ and respectively $R_2$ that are defined in Formula I; $R_{11}$ is an alkylene, cycloalkylene, alkenylene, alkinylene or arylene radical containing up to 10 carbon atoms, which radical may be alkyl-substituted and/or halogen-substituted; and $R_{12}$ is an alkyl or tert.-arylalkyl radical containing up to 10 carbon atoms, which radical may be alkyl-substituted and/or halogen-substituted, or a radical having the formula:

in which $R_7$ is as defined in Formula II and $R_9$ and $R_{10}$ are the same as $R_1$ and $R_2$ as defined in Formula I.

These compounds can be considered structurally derived from the ketones of which they are the monoperoxyketals. To the above described class belong for example the following peroxides:

2-cumylperoxy-2-butoxy-butane
2-tert.butylperoxy-2-methoxy-propane
2-tert.butylperoxy-2-ethoxy-propane
2-tert.butylperoxy-2-propoxy-propane
2-tert.butylperoxy-2-butoxy-propane
2-tert.butylperoxy-2-phenoxy-propane
2-tert.butylperoxy-2-methoxy-butane
alpha-tert.butylperoxy-alpha-methoxy-ethylbenzene
alpha-tert.butylperoxy-alpha-ethoxy-ethylbenzene
alpha-tert.butylperoxy-alpha-isobutoxy-ethylbenzene
2-cumylperoxy-2-methoxy-propane
2-cumylperoxy-2-ethoxy-propane
2-cumylperoxy-2-propoxy-propane
2-cumylperoxy-2-phenoxy-propane
2-cumylperoxy-2-methoxy-butane
alpha-cumylperoxy-alpha-methoxy-ethylbenzene
alpha-cumylperoxy-alpha-ethoxy-ethylbenzene
alpha-cumylperoxy-alpha-isobutoxy-ethylbenzene
alpha-cumylperoxy-alpha-sec-butoxy-ethylbenzene
alpha, alpha'-dimethoxy-alpha, alpha'-di-tert.butylperoxy-diethylbenzene
alpha, alpha'-dimethoxy-alpha, alpha'-di-cumylperoxy-diethylbenzene
1,4-diisopropylbenzene-alpha, alpha'-bis(2-ethoxy-isopropylperoxide)
1,3-diisopropylbenzene-alpha, alpha'-bis(2-ethoxy-isopropylperoxide)
2,2'-dimethoxy-diisopropyl-peroxide
2,2'-diethoxy-diisopropyl-peroxide
2,2'-dipropoxy-diisopropyl-peroxide
2,2'-dibutoxy-diisopropyl-peroxide
1,1'-dimethoxy-1,1'-diphenyl-diethyl-peroxide
1,1'-diethoxy-1,1'-diphenyl-diethyl-peroxide
1,1'-dibutoxy-1,1'-diphenyl-diethyl-peroxide 2,5-di[di(2,2'-dimethoxy)isopropylperoxy]-2,5-dimethyl-hexine-3

2,5-di[di(2,2'-dimethoxy)isopropylperoxy]-2,5-dimethyl-hexene-3

2,5-di[di(2,2'-dimethoxy)isopropylperoxy]-2,5-dimethyl-hexane 1,4-di(alpha,alpha'-dimethoxy, alpha, alpha'-di-tert.butylperoxy)-ethylcyclohexane.

The peroxides of this invention can be prepared according to a new method described in our Italian patent application No. 23,317/64 filed on Oct. 30, 1964 wherein an alkyl-vinyl-ether or a 1-alkenylalkyl-ether is reacted with an organic hydroperoxide, in the presence of solid catalysts in heterogeneous phase, said catalysts being selected, for example, from cation exchange resins, aluminum oxide, silica gel and carbon black.

They can, however, also be obtained by utilizing certain of the known methods for the preparation of other peroxidic compounds, such as for example:

(1) Addition of organic hydroperoxides or of hydrogen-peroxide to the alkylvinylethers, for example in the conditions described in the U.S. Pat. 2,776,319 using the usual acid homogeneous catalysts.

(2) Transperoxidation of an acetal with an organic hydroperoxide according to the general method described by Rieche et al. (Chem. Ber., 94, 2457 (1961)).

(3) Reaction between an alpha-substituted ether and hydrogen peroxide or an alkylhydroperoxide according to Rieche at al. (Chem. Ber., 90, 1225 (1957)).

(4) Reaction between a saturated ether and a hydroperoxide, catalized by a transititon metal salt described by Kharasch et al. (J. Org. Chem., 24, 72–78 (1959)).

The new peroxides of the above defined general formula are stable compounds. The lower molecular weight members of the series are liquids which are distillable at reduced pressure, whereby they may be separated and purified. They are stable in a neutral or alkali medium, but are generally decomposed in acid media. This last characteristic permits the demonstration of their chemical structure in a simple manner. When the peroxides of this invention are treated with acids, they split (as occurs with acetals, ketals, peracetals or perketals) with formation of a ketone, an alcohol and a hydroperoxide, according to the equation:

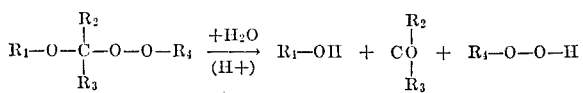

The various components in the reaction mixture can be then easily identified via known chemical or physical-chemical methods. The ketone, for example, reacts with semicarbazide, dinitrophenylhydrazine or hydroxylamine to form solid compounds which can be isolated and then identified from their melting points. The alcohol can, in some cases, be separated directly by distillation and also can be identified through the formation of dinitrobenzoate by reaction with dinitrobenzoic acid. The hydroperoxide, which normally coincides with the hydroperoxide used in the synthesis with one of the various indicated methods of preparation, can be identified through formation of characteristic crystalline compounds by reaction with N-methyl - 6,8-dinitro-2-ethoxy-1,3-dihydroquinoline (Rieche et al., Chem. Ber., 92 (1959), 2239).

The new peroxides of the present invention are useful in a variety of applications typical of organic peroxides, for example, as free radical polymerization initiators, as catalysts for the cross-linking of varnishes and hardening of unsaturated resins, as additives for diesel oils and as vulcanizing agents for saturated and unsaturated synthetic elastomers. The following examples illustrate the invention without limiting its scope.

EXAMPLE 1

Alpha-tert.butylperoxy-alpha-methoxy-ethylbenzene,

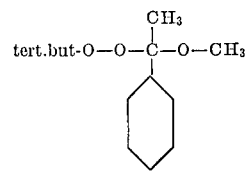

was prepared from alpha-methoxy-styrene and tert.butyl-hydroperoxide in the presence of a $BF_3$ catalyst, according to the following method:

67 g. (0.5 mol) of alpha-methoxystyrene and 45 g. (0.5 mol) of tert. butylhydroperoxide were dissolved in 200 cc. of anhydrous ethyl ether. The solution was cooled to 0° C., and 5 drops of an ethyl ether solution containing 45% by weight of $BF_3$ (which forms a 1:1 complex of $BF_3$:ether) were added to the cooled solution. After a reaction of one hour at 0° C. the product was poured into water and the organic layer was separated and washed 4 times with a 10% NaOH solution and then dried. The ether was then removed by distillation. The crude peroxide product which was so obtained comprised 78% peroxide together with unreacted alpha-methoxy-styrene, as determined by iodometric analysis of the active oxygen.

The pure product which was obtained by fractional distillation, had the following characteristics: boiling point=51–52° C. (at 0.25 torr); $n_D^{20}$=1.4808, $d_4^{20}$=0.9848.

Calculated: M.W., 224; C, 69.6%; H, 8.92%; active oxygen, 7.15%; $(R)_D^{20}$, 63.99. Found: M.W., 226; C, 69.8%; H, 8.31%; active oxygen, 7.09%; $(R)_D^{20}$, 64.1.

Note: $(R)_D^{20}$ is the molecular refraction calculated according to Lorentz's formula $$\frac{n^2-1}{n^2+2} \cdot \frac{M}{d}$$

In order to determine its structure, the peroxide was treated with concentrated hydrochloric acid. When the exothermic reaction was finished the mixture was diluted with 2 vol. of ethanol and the resulting solution was treated with alcoholic phosphoric 2,4-dinitro-phenylhydrazine (the dinitro-phenylhydrazine solution consists of 25 g. of product dissolved in an admixture of 300 cc. $H_3PO_4$ at 80%+200 cc. of 95% ethanol) in a water bath for 15 minutes. The precipitate was filtered and recrystallized from ethanol. The melting point of the resulting dinitrophenylhydrazone was 250° C., which corresponds to the value given in the literature for the melting point of the 2,4-dinitrophenylhydrazone of acetophenone. From the hydrolysis mixture methanol was distilled and was identified by chromatographic analysis.

EXAMPLE 2

The peroxide described in Example 1 was prepared from acetophenonedimethylacetal by transperoxidation with tert.butylhydroperoxide according to the following process: 84 g. of acetophenonedimethylacetal and 45 g. of tert.butylhydroperoxide were added to a 250 cc. flask which was then kept in a constant temperature bath at 90° C. for about 15 hours while continuously distilling off the free methanol formed. The reaction product was then poured into water and the organic layer extracted with ethyl ether; pure peroxide was isolated as described in Example 1.

The pure product obtained after fractional distillation was the same on spectrophotometric I.R. analysis as that of Example 1.

EXAMPLE 3

Preparation of 2-tert.butylperoxy-2-ethoxy-propane

This peroxide was prepared from acetone-diethyl-acetal by transperoxidation with tert.butylhydroperoxide, as in Example 2. The molar amounts that were reacted were the same as in Example 1.

After the excess of hydroperoxide was removed by washing with alkali and the unreacted acetal was removed under vacuum, the resulting product contained 91% peroxide as shown by iodometric analysis.

EXAMPLE 4

Preparation of alpha-isobutoxy-alpha-tert.butylperoxy-ethyl-benzene

This peroxide was prepared from alpha-isobutoxy-styrene and tert.butylhydroperoxide using as the catalyst an ion exchange resin (Kastel C–300—a Montecatini product-sulfonated styrene-divinylbenzene copolymer) according to a method described in applicants' Italian application No. 23,317/64 filed on Oct. 30, 1964. The molar amounts which were reacted are the same as in Example 1.

The product obtained after removal of the excess of hydro-peroxide contained 85% peroxide.

After purification and acid hydrolysis by treatment with 2,4-dinitrophenylhydrazine, a dinitrophenylhydrazone was obtained which, after recrystallization from ethanol, exhibited a melting point of 247° C., which corresponds to that given in the literature for the 2,4-dinitrophenylhydrazone of acetophenone.

EXAMPLE 5

Preparation of alpha(cumylperoxy)-alpha-methoxy-ethyl-benzene

This peroxide was prepared from alpha-methoxy-styrene and cumylhydroperoxide in solvent, using as the catalyst an ether solution of $BF_3$. The molar amounts of the reacted compounds and the amount of catalyst were the same as in Example 1.

The crude peroxide obtained contained 18% cumyl hydroperoxide and 82% peroxide, as shown by iodometric analysis. The hydroperoxide was removed by repeated washing with a 10% NaOH solution and any traces of alpha-methyl-styrene were removed by maintaining the product at 50° C. under 0.5–1 mm. Hg for 5 hours.

The purified peroxide was hydrolyzed with an ion exchange resin (Kastel C–300) at 35° C. for 2 hours (in order to avoid splitting of the cumyl hydroperoxide into phenol and acetone, since the latter could interfere in the search for the ketone formed by the peroxide).

The 2,4-dinitrophenylhydrazone obtained from the hydrolyzed solution had a melting point of 250° C., which corresponds to that of the 2,4-dinitrophenylhydrazone of acetophenone.

EXAMPLE 6

Preparation of alpha, alpha'-di-tert.butylperoxy-alpha, alpha'-dimethoxy-p.diethyl-benzene This peroxide was obtained from alpha,alpha'-dimethoxy-p.-divinylbenzene with tert.butylhydroperoxide, using as catalyst an ether solution of $BF_3$. The molar amounts, the method used, and the amount of catalyst were the same as in Example 1.

The product obtained after removing the excess of hydroperoxide contained 89% peroxide. By hydrolizing it with concentrated hydrochloric acid and treating with 2,4-dinitrophenylhydrazine, the hydrazone was obtained, which hydrazone, after recrystallization from ethanol, exhibited a melting point of 232° C., corresponding to that given in the literature for the dinitro-phenylhydrazone of 1,4-diacetyl-benzene.

EXAMPLE 7

Preparation of 1,4-diisopropylbenzene-alpha'-bis(2-ethoxy-isopropylperoxide)

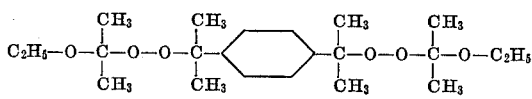

The peroxide was prepared from 2 mols of ethyl-isopropylether and 1 mol of p-diisopropylbenzene-dihydroperoxide in the presence of a catalyst consisting of ethereous $BF_3$ in benzene solution.

The crude product obtained after evaporating the solvent contained 9.3% dihydroperoxide and 85% diperoxide. The excess dihydroperoxide was removed by alkali washing with 10% NaOH and recovered by the addition of $CO_2$ to the alkali-extracted solution; the unreacted ethyl-isopropenylether was removed under vacuum.

The thus purified product, after acid hydrolysis with an ion exchange resin at 35° C. for 3 hours, was treated with 2,4-dinitrophenyl-hydrazine, and the dinitrophenylhydrazone of acetone was isolated, which hydrazone, after recrystallization from ethanol, melted at 127° C.

EXAMPLE 8

Preparation of 1,1'-dimethoxy-1,1'-diphenyl-diethyl-peroxide

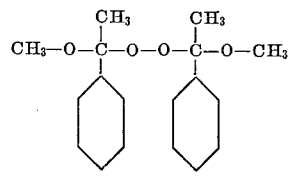

This peroxide was obtained from 2 mols of alpha-methoxy-styrene by treatment with 1 mol of anhydrous ether solution of $H_2O_2$ having a concentration of 1 mol/liter, in the presence of an ion exchange resin (Kastel C–300) according to the method described in the co-pending application Ser. No. 505,761, filed Oct. 29, 1965.

The obtained crude product contained 92% peroxide as determined by analysis of active oxygen. After washing with alkali and with a neutral $FeSO_4$ solution, the product was kept at 50° C. under 1 mm. Hg for 5 hours and then hydrolyzed with concentrated hydrochloric acid and treated with 2,4-dinitrophenylhydrazine.

The hydrazone obtained, after recrystallization from ethanol, melted at 247° C., which corresponds to the melting point of the corresponding derivative of acetophenone.

EXAMPLE 9

Preparation of 2,2'-diethoxy-diisopropylperoxide

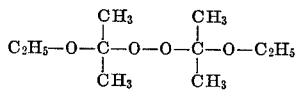

This peroxide was obtained from ethyl-isopropenyl-ether and an ether solution of $H_2O_2$ (1 mol/liter) according to the process described in Example 1. The crude from the reaction, after repeated washing with alkali and with neutral $FeSO_4$, was kept at 20 mm. Hg and at 50° C. for 3 hours.

Iodometric analysis indicated that the obtained peroxide was 98% pure. After an acid hydrolysis, it was treated with 2,4-dinitrophenylhydrazine. The dinitrophenylhydrazone obtained, after recrystallization from ethanol, exhibited a melting point of 127° C., which corresponds to that given in the literature for the corresponding derivative of acetone.

Having thus described our invention, what we desire to secure by Letters Patent and hereby claim is:
1. A peroxyether having the formula

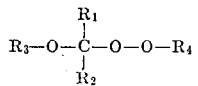

in which each of $R_1$, $R_2$ and $R_3$ is an unsubstituted alkyl having up to 10 carbon atoms and $R_4$ is an unsubstituted tertiary alkyl having up to 10 carbon atoms.

2. 2-tert.butylperoxy-2-ethoxy-propane.

References Cited
UNITED STATES PATENTS

| 3,030,386 | 4/1962 | Weissermel et al. | 260—610 |
| 3,069,474 | 12/1962 | Rieche et al. | 260—610 |

BERNARD HELFIN, Primary Examiner

W. B. LONE, Assistant Examiner

U.S. Cl. X.R.

44—77; 252—426